United States Patent [19]

Girty

[11] Patent Number: 4,470,321
[45] Date of Patent: Sep. 11, 1984

[54] MOTORCYCLE GEAR SHIFT CONTROL DEVICE

[76] Inventor: Kenneth E. Girty, R.D. #1, Dowells Trailor Ct., Saxonburg, Pa. 16056

[21] Appl. No.: 211,458

[22] Filed: Nov. 28, 1980

[51] Int. Cl.³ ............................................. G05G 1/14
[52] U.S. Cl. ..................................... 74/474; 74/512; 74/560
[58] Field of Search .............. 74/474, 560, 562, 562.5, 74/564, 478, 478.5, 512, 561

[56] References Cited

U.S. PATENT DOCUMENTS

| | | | |
|---|---|---|---|
| 543,855 | 8/1895 | Denison | 74/560 |
| 1,309,557 | 7/1919 | Valkenburg | 74/478 |
| 1,584,712 | 5/1926 | Bailey et al. | 74/478.5 |
| 1,645,028 | 10/1927 | Stone | 74/512 |
| 1,919,968 | 7/1933 | Trabold | 74/560 |
| 3,919,896 | 11/1975 | Foster | 74/474 |
| 4,083,263 | 4/1978 | Lundquist | 74/474 |
| 4,237,752 | 12/1980 | Hildebrecht | 74/478 |

*Primary Examiner*—Kenneth Dorner
*Attorney, Agent, or Firm*—George C. Atwell

[57] ABSTRACT

A foot actuated gear shifting device is provided for a motorcycle which is compatible with current motorcycle structures such that it could be included as standard equipment or be utilized as an accessory attachment to simplify the shifting action accomplished by one foot of the operator. The structure of the invention includes a unitary foot pedal adapted to be installed in the normal position where the operator rests his left foot. The pedal is adapted to support the entire foot of the operator and pivot about a point beneath the foot arch. The forward end of the pedal is connected to the outer end of the motorcycle's gear shift lever such that shifting action can be accomplished by the operator causing the pedal to rock forwardly or rearwardly; consistent with the direction in which he wishes to move the gear shift lever. The device of the invention is preferably adapted for attachment to the foot rest component which is standard on most motorcycles, and preferably includes adjustment means by which the operator can selectively vary the upper surface configuration of the pedal in accordance with a particular shoe style.

4 Claims, 9 Drawing Figures

Fig. 5.
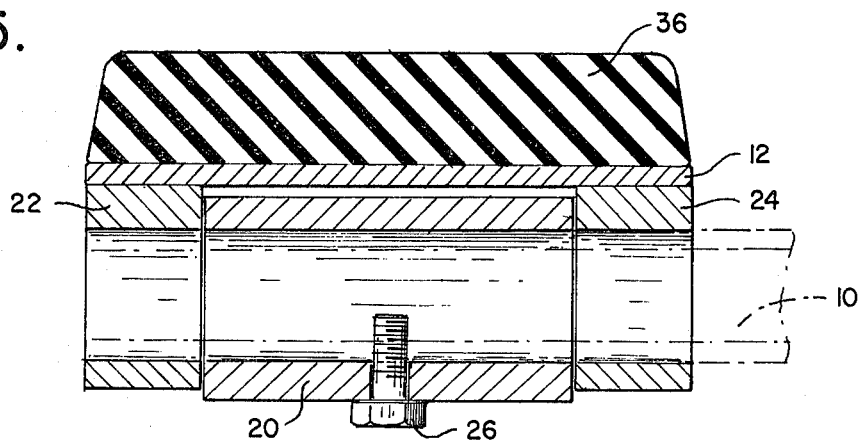
Fig. 6.
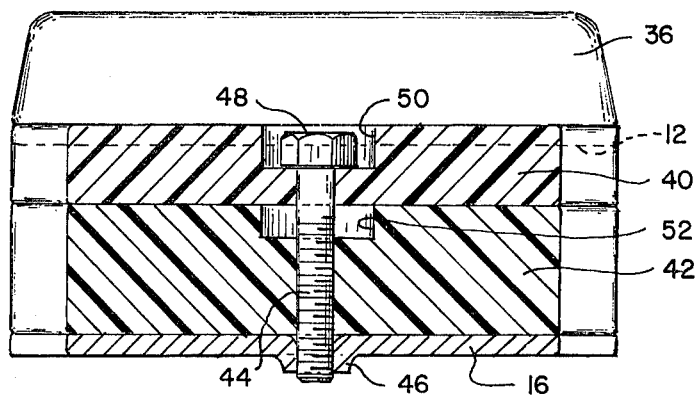
Fig. 7.
Fig. 8.
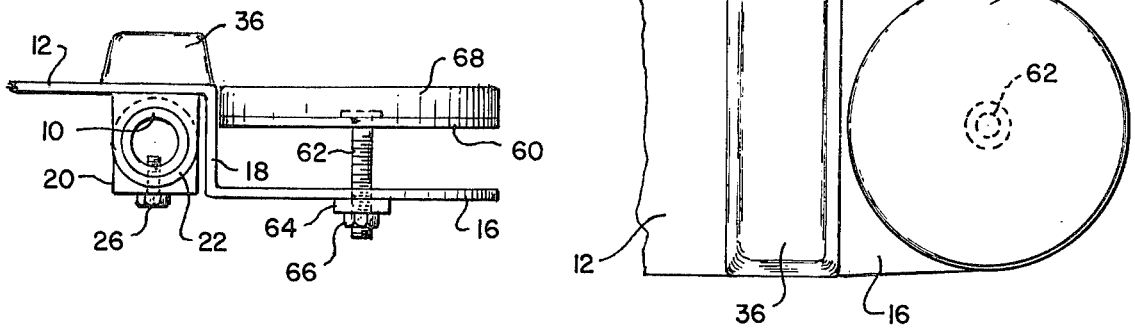

MOTORCYCLE GEAR SHIFT CONTROL DEVICE

Much of the functional and control equipment on motorcycles has become generally standardized in recent years. Such standardization has included the location and function of controls such as gear shift assemblies. On the typical motorcycle, the gear shifting action is accomplished by a hand-operated clutch lever and a pivotal gear shift lever extending from the gear box with its end properly oriented for engagement by the operator's toe portion of his shoe. The lever is adapted whereby it may be caused to pivot downwardly from toe pressure or upwardly by insertion of the toe beneath the projecting end of the lever, while the operator's foot is resting on a laterally projecting bar to enable the foot to be rocked an impart the shifting motion to the shifting lever.

While the foregoing arrangement has been generally acceptable, it nevertheless is objectionable to many operators because of the need to reposition the foot relative to the end of the shift lever whenever it is necessary to change direction of movement of the lever consistent with the desired shifting action. Moreover, this arrangement presents some difficulty to rapid shifting and to inexperienced operators for whom the intricacies of gear shifting must be mastered at the same time familiarity with all other controls of the machine must be developed.

In the prior art the need for a simplified means for accomplishing gear shifting action on a motorcycle by foot manipulation has been recognized and variously addressed. U.S. Pat. No. 2,540,926 provides a relatively complicated conversion unit primarily suited for the type of motorcycle structure prominent in the late 1940's and which has the advantage of permitting foot-actuated shifting without the requirement for extreme toe repositioning. U.S. Pat. Nos. 3,919,896 and 4,083,263 teach variations in the design and shape of the shifting lever itself whereby upward and downward shifting action is accomplished by having the toe portion of the foot retained between pegs respectively located at the ends of a bifurcated lever.

SUMMARY OF THE INVENTION

The present invention comprehends the provision of a foot controlled device on a motorcycle for operating the motorcycle's gear shift lever, including a pedal having an upper surface large enough for the typical operator to rest his entire foot thereon and adapted to be rocked by the foot to accomplish gear shifting action during operation of the motorcycle. In its presently preferred form the control device of the present invention includes a fastening means located centrally beneath the foot pedal and connected to the foot pedal in a hinged relation. The fastening means is preferably formed and adapted to be fixedly connected to a foot rest or bar which normally projects outwardly at the side of the typical motorcycle, as a standard component thereof. The forward end of the foot pedal is provided with means for connecting it to a laterally projecting peg at the end of the typical gear shift lever now provided on a motorcycle, and means are provided for adapting the upper surface of the foot pedal to conformably adjust it in accordance with the type of shoe or boot being worn by the operator.

These and other objects, advantages and features of the invention, as well as the details of the presently preferred embodiment, will be more fully understood and appreciated from the ensuing detailed description.

BRIEF DESCRIPTION OF THE DRAWINGS

FIG. 5 is a cross-sectional view taken on lines V—V of FIG. 2;

FIG. 6 is a cross-sectional view taken on lines VI—VI of FIG. 2;

FIG. 7 is a partial side elevational view of an alternate form of the invention;

FIG. 8 is a partial top plan view of the structure shown in FIG. 7.

DESCRIPTION OF THE PREFERRED EMBODIMENTS

Figure 1A:
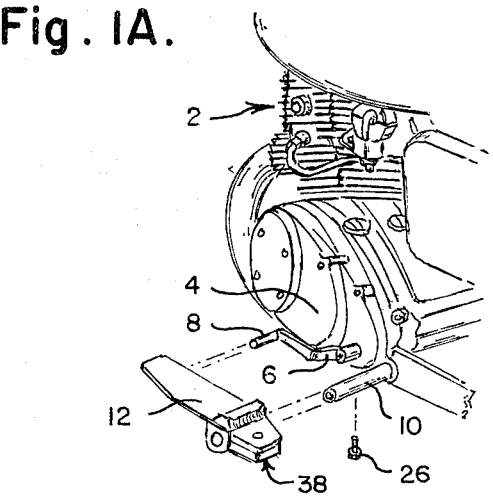
FIGS. 1A and 1B are partial perspective views of the engine and gear box area of a motorcycle, illustrating the operative location of the structure of the present invention.
Figure 1B:
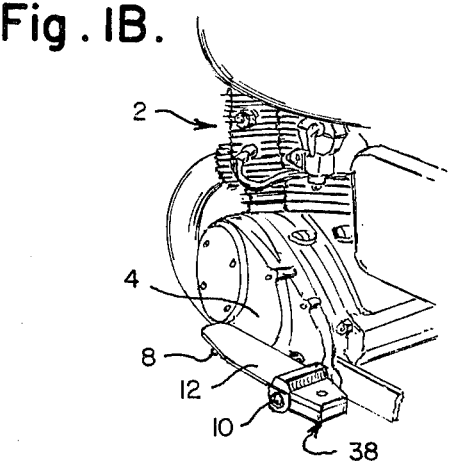

In FIGS. 1A and 1B there is illustrated a motorcycle 2 having within its frame a gear box 4. Extending forwardly from the gear box 4 is a gear shift lever 6 having a laterally projecting end peg 8. Disposed a short distance rearwardly of the peg 8 is a laterally projecting bar or foot rest 10 on which the left foot of the motorcycle operator normally rests during operation of the machine. The operator's boot normally rests on the foot rest 10 whereby the forward edge of the shoe heel is against the foot rest 10. The toe of the shoe extends forwardly to manipulate the peg 8 upwardly or downwardly to thereby pivot the shift lever 6 from one gear position to another, pursuant to the typical gear shift arrangement which has a neutral position and gear engaging positions corresponding to first, second, third, and fourth gears. The present invention comprehends a gear shift lever control device which, in its preferred embodiment, is adapted to be pivotally attached to the foot rest 10 as shown in FIG. 2.

The device of the present invention includes a rigid plate member 12 having a forward end or toe rest portion 14 and a rearwardly extending heel rest portion 16. The plate member 12 has an intermediate offset area 18 whereby the toe rest portion 14 is situated at a higher level as compared to the heel rest portion 16. The need for retaining the plate member 12 in its installed operative position preferably comprises a sleeve means made up of a sleeve or collar 20 (FIG. 4) having an appropriate inside diameter to permit it to be slidably fit on to the bar or foot rest 10. The underface of the plate number 12 in the area of the offset 18 is provided with spaced apart integral semi-arcuate bracket portions 22 and 24 having substantially the same inside diameter as the collar 20 whereby they will permit sliding installation of the plate member 12 on to the cylindrical foot rest 10, with the tubular collar 20 in the position shown in FIG. 4. Specifically, for most motorcycle constructions, the installation may be accomplished by removing from the foot rest 10 a cylindrical hose-like rubber sleath, which is normally provided by the manufacturer, to reveal the rigid bar or foot rest 10 therebeneath.

Figure 2:
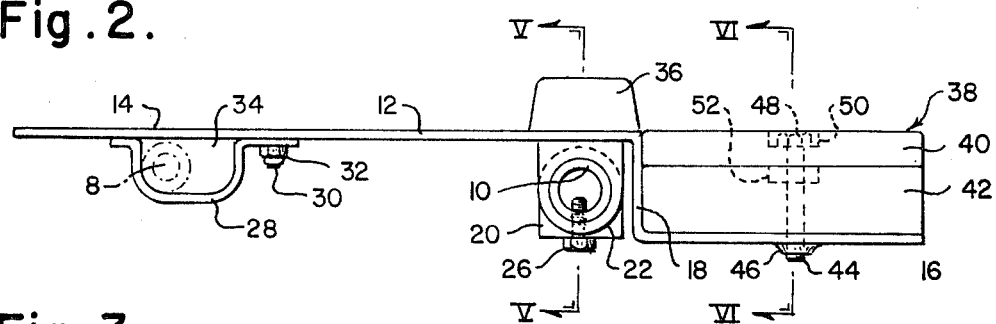
FIG. 2 is a side elevational view of the gear shift lever control device of the present invention, shown in a significant larger scale as compared to FIG. 1.
Figure 4:
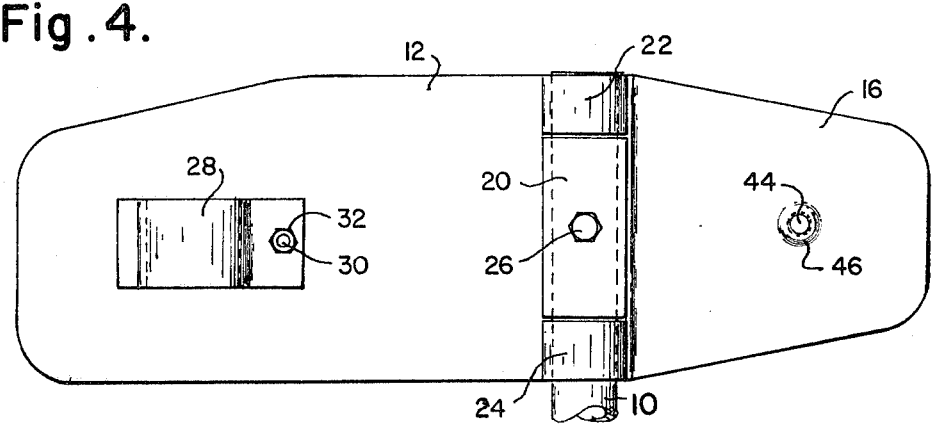
FIG. 4 is a bottom plan view of the gear shift lever control device shown in FIG. 2.

The assembly, as shown in FIG. 4, is installed on the foot rest 10 to the position shown in FIG. 2, after which a set screw 26 is rotatably driven inwardly, through a threaded opening in the sidewall of the collar 20, through a pre-drilled accommodating hole in the foot rest 10. The attachment of the device of the present invention utilizing the fastening means heretofore described permits the plate member 12 to be rocked or pivoted by the foot of the operator in a short arc about the axis of the foot rest 10.

Bolted to the undersurface of the toe rest portion of the plate member 12 is a U-shaped bracket 28 retained in position by a fastner means comprising a bolt 30 and a nut 32. The bracket 28 is of a size, configuration and location to form, in cooperation with the adjacent undersurface of the toe rest portion of the plate member 12, an opening 34 in which the peg 8 of the shift lever 6 is loosely captured.

In FIG. 2 it will be seen that the width of the opening 34 provided by the bracket 28 is significantly greater than the diameter of the peg 8. Accordingly, the peg 8 may move longitudinally within the opening 34 as the shift lever 6 pivots upwardly or downwardly in response to foot manipulation of the disclosed device. In other words, the distance between the axis of the peg 8 and the axis of the bar 10 varies in accordance with the pivotal motion of the shift lever 6. The bracket 28 is adapted to accommodate this variance.

Figure 3:
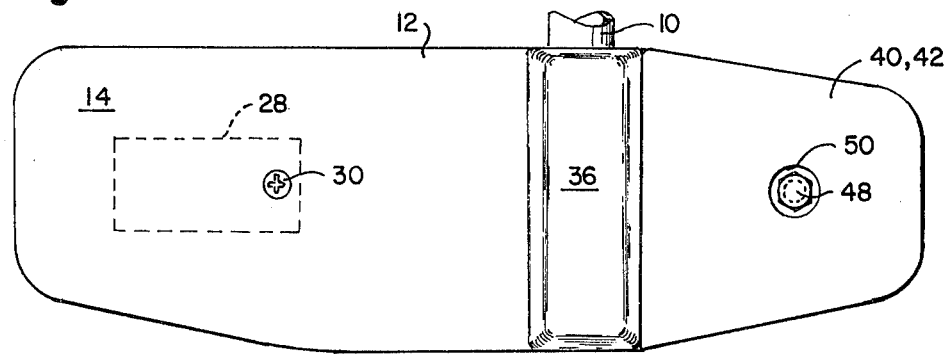
FIG. 3 is a top plan view of the gear shift lever control device first shown in FIG. 2.

On the upper surface of the plate member 12, directly above the foot rest 10, is fixed an upwardly protruding ridge-like block 36. The block 36 extends parallel to the axis of the foot rest 10 and entirely across the upper surface of the plate member 12, as shown in FIG. 3, and becomes the support surface on which the arch of the operator's foot rests during operation of the motorcycle. The block 36 serves the general purpose as formerly provided by the foot rest 10 before the installation of the device of the present invention.

The heel rest portion 16 of the plate member 12 is disposed at a level substantially lower than that of the forward toe rest portion 14. Portion 16, as shown in FIGS. 5 and 6, accommodates thereon a heel rest pad assembly 38 comprising upper and lower rubber pads 40 and 42, held in place by a bolt 44. The bolt 44, which has a head 48 contained in a complimentary shaped recess 50 in pad 40, threads into a complimentarily threaded central pierced hole 46 in the portion 16.

It should be noted that pad 42 is similarly provided with a recess 52, and that the pads 40 and 42 are of different thicknesses. This enables either pad to be entirely removed and the remaining pad used separately to establish a relatively different height for the heel rest. The pad selected can be utilized with a retaining fastener means wherein the bolt is of the appropriate length commensurate with the thickness of the selected pad. Alternatively, both pads may be removed entirely to present a substantially low heel rest surface as may be desirable where the operator uses a boot or similar foot wear having an unusually high heel.

FIGS. 7 and 8 illustrate an alternative form for a heel rest pad assembly which comprises a circular plate portion 60 have an integral downwardly projecting threaded stud 62 which extends through an accommodating central opening in the toe rest portion 16 of the rigid plate 12. As shown in FIG. 7, fixed boss 64 on the underside of the heel rest portion 16 has a central threaded opening therethrough which is coaxial with the central opening through heel rest portion 16. Firmly bonded to the upper surface of the circular plate 60 is a rubber pad 68 having a circular configuration as shown in FIG. 8. It should be noted that the outer edge of the heel rest portion 16, as shown in FIG. 8, is, in this form of the invention, provided with an arcuate shape to conform to the circular outer edge configuration of the pad 68.

The structure shown in FIGS. 7 and 8 and heretofore described, provides a means for the motorcycle operator to selectively adjust the height of the heel pad 68 by releasing a lock nut 66, grasping the pad 68 and rotating it in either direction, causing the stud 62 to threadably move through its threaded engagement in boss 64, and then retighten the lock nut 66 to maintain the pad 68 at the selected level.

Having heretofore described the various components, features and functions of the present invention, it should now be apparent that the device provided enables the operator of a motorcycle to accomplish a gear shifting action by appropriate limited foot motion while the foot is in a resting position and without the need to reposition the toe above or below the peg of the shift lever, as heretofore commonly required. It should also be apparent that the structure of the present invention may be fabricated for installation on most conventional motorcycles.

While certain presently preferred forms of the invention have been heretofore described as shown, other equivalent variations may occurr to those skilled in the art in light of the above teachings. For example, it is contemplated that a structurally different means for securing the device to a motorcycle may be provided where it is desirable to install the device or its functional equivalent as standard original equipment on a motorcycle. Accordingly, it should be understood that the appended claims are intended to cover all such variations coming within the spirit and scope of the present invention.

I claim:

1. For a motorcycle having a gear shift lever disposed for foot actuation by the operator, and the lever having an outer end movable in a generally vertical plane to separate shift positions, a control device for shifting gears of the motorcycle comprising:
   a. an elongated pedal having a top foot-supporting surface and having attachment structure for attaching the pedal to a structural part of the motorcycle in a position to comfortably support a foot of the operator and in a position locating one end of the pedal immediately adjacent the gear shift lever;
   b. connecting means directly connecting the one end of the pedal to the gear shift outer end; and
   c. the attachment structure being adapted to permit pivotal shifting action of the pedal about an axis projecting generally laterally from the motorcycle structure so that all shifting action is imparted to the lever by downward force of the operator's foot causing the pedal to pivot about the axis.

2. The control device of claim 1 wherein the connecting means comprises a bracket fixed to the pedal and located below the top surface of the pedal, and the bracket has an opening for receiving the outer end of the gear shift lever therein.

3. The control device of claim 1 wherein the attachment structure includes a sleeve adapted to slide over and be fixedly attached to a laterally projecting foot rest component of the motorcycle.

4. The control device of claim 1 wherein the connecting means is adapted to compensate during gear-shifting action to a change in the distance between the gear shift outer end and the axis about which the pedal pivots.

* * * * *